Jan. 26, 1943.  F. NANASKO  2,309,350
HOLDER FOR FISHING RODS
Filed Nov. 25, 1941
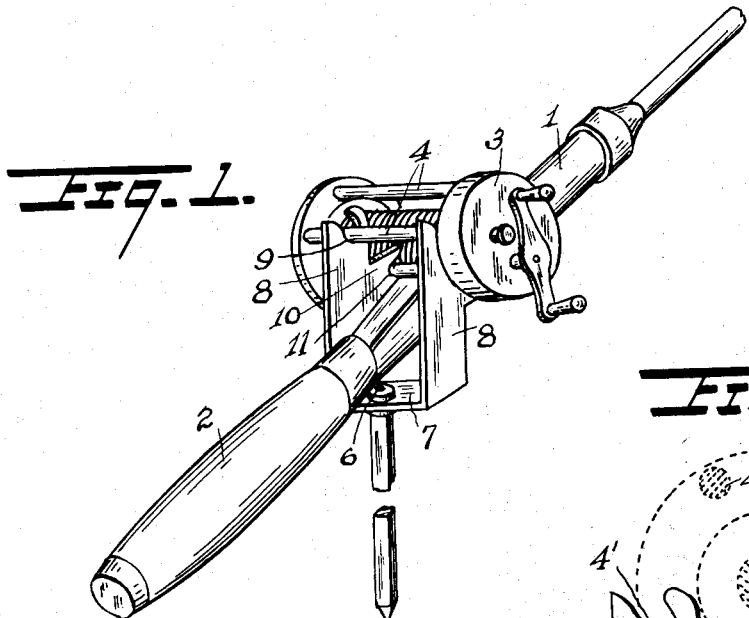
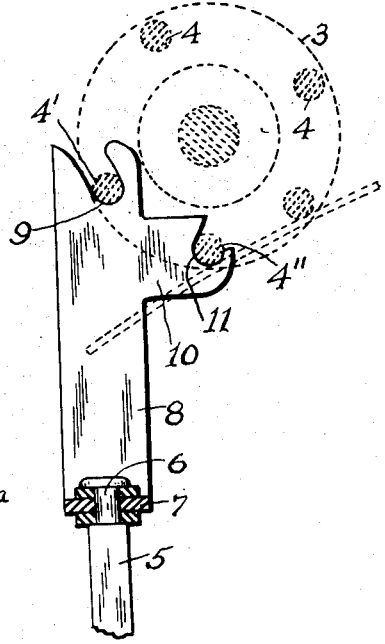
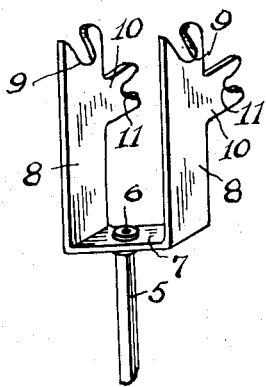
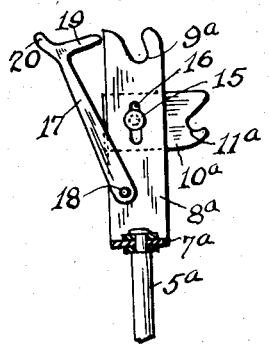
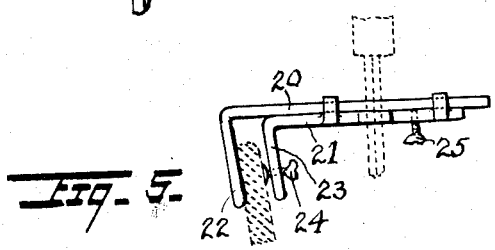
Frank Nanasko, Inventor
Attorneys Patented Jan. 26, 1943

2,309,350

UNITED STATES PATENT OFFICE 2,309,350

HOLDER FOR FISHING RODS

Frank Nanasko, Reading, Pa.

Application November 25, 1941, Serial No. 420,333

5 Claims. (Cl. 248—45)

My invention relates to an improved device for holding a fishing rod in suspended angling position, my main objects being to simplify the device for easy storage and ready use, to provide for an easily effected engagement of the rod and its secure retention against undesirable release, to support the rod handle in projecting unobstructed position for quickly grasping the same, and to provide for intentional release of the rod from the holder by a natural tilting and lifting of the rod when grasped by the fisherman.

With the above objects in view, and with other objects as will later herein appear, my improved holding device comprises a suitable support having upstanding arms provided with notches adapted to be hooked into engagement with the spacing rings of a reel so as to hold the rod fixed to said reel in suspended angling position, as will be more fully described hereinafter in connection with the accompanying drawing, and the novel features thereof pointed out in the appended claims.

Fig. 1 is a perspective elevation of a holder embodying my improvements and showing a fishing rod supported therein.

Fig. 2 is a perspective view of the holder shown in Fig. 1.

Fig. 3 is an enlarged scale view, in vertical section, of the holder shown in Fig. 2, the reel with which it engages, being shown in dotted lines.

Fig. 4 is a sectional elevation of a holder, showing a modified construction.

Fig. 5 is a side elevation of a boat-clamping device adapted to support my holding device.

The fishing rod 1 shown in the drawing may be of any usual construction, having a handle 2, and a winding reel 3 secured thereto in known manner, with the frame ends of the reel fixedly spaced by rungs or bars 4.

My improved holder, as shown in the drawing, comprises a stake or post 5, adapted to be forced into the ground, or otherwise held, and carries at its upper end, preferably pivotally connected thereto as shown at 6, a cross plate 7 having parallel upright arms 8, 8, spaced so as to be laterally spread from the rod 1 to be suspended between them. These arms, as shown, are provided with notches 9, 9 in their upper edges, the openings thereto being preferably slightly arcuate as indicated for a purpose hereinafter set forth. Angular extensions 10, 10 of arms 8, 8, are shown as having notches 11, 11 in the extended ends, also preferably with slightly arcuate openings thereto.

The spread of arms 8, 8, while laterally spaced from rod 1, is such that they may loosely extend between the frame end of the reel 3, and engage their notches 9, 9 and 11, 11 with rungs 4, 4, of said reel, as shown. This engagement is preferably a hooked engagement, more clearly seen in Fig. 3, and is effected in a simple and natural manner as follows: The fisherman, grasping the rod by its handle 2, merely elevates the tip end of the rod sufficiently to enter rung 4' into the slots 9, 9 of arms 8, 8 and when said rung is thus engaged, it will act as a pivot shaft about which the rod is swung until rung 4'' enters and engages notches 11, 11 in arm extensions 10, 10. The reel 3 is thus firmly held, and the rod 1, fixed to said reel, is suspended in angling position, with its handle 2 extending rearwardly beyond the arms 8, 8 in free and unobstructed position. Release of the rod from the holder, is effected simply and naturally, by first tilting the rod to free its rung 4'' from the notches 11, 11, and then lifting the rod to free rung 4' from the notches 9, 9, this tilting movement being the natural action of the fisherman when he grasps the handle after a fish has been hooked.

The preferred arcuate openings to the slots 9, 9, and 11, 11, prevent disengagement of the reel, except by tilting of the rod 1 as described, and pull of a fish on the line will tend to lower the tip of the rod and thus more securely hold the reel against displacement. And the reel being thus fixedly held, acts to support the rod in proper suspended position, with the handle 2 advantageously free for quick grasping. The stake 5 is of sufficient length to hold the handle 2 free from contact with the ground, and the preferred pivotal connection of plate 7 to said stake 5, permits turning of the arms 8, 8 to properly direct the suspended rod, such turning however being preferably against friction of the pivotal connection 6, so it will maintain a set position.

In Fig. 4 I have indicated the extension 10a, 10a, as separately formed parts, secured to arms 8a, 8a, in any convenient manner, but preferably by means of a bolt 15, and a slot 16 may be provided so the extension 10a, 10a may be adjusted to properly locate their notches 11a relative to notches 9a to accommodate varying spacings of rungs of different reels. Also in Fig. 4 I have shown a latch 17, pivoted at 18 to an arm 8a, with its hooked end 19 adapted to swing over and lock a reel rung in its notch 9a, a finger tip 20 being provided to easily swing said latch into and out of locking position.

And in Fig. 5 I have shown a clamp, adapted to be secured to a boat, or other support, and comprising sliding arms 20 and 21 having jaws 22, 23 and set screws 24 and 25, the arms 20 and 21 having openings to receive the stake 5a of a holder. Such stake 5, or 5a, may be bifurcated if desired, or two stakes may be employed at times.

It will be seen that my holder, as above described, provides for supporting the rod in simplified angling position by the novel means of engaging the reel only; and it firmly and fixedly supports the rod with a free unobstructed handle end, and provides for a simple and natural engagement and disengagement of the reel and its attached rod when desired. My holder may be simply and economically made, and is of small compact size for easy carrying and quick setting up. The specific construction above fully described may of course be modified and varied within the scope of my invention as defined in the following claims.

What I claim is:

1. A holder for a fishing rod provided with an affixed reel, comprising a supporting member having spread arms adapted to partly encircle said rod in spaced non-contacting relation and to extend upwardly above said rod, said arms having notches adapted to engage said reel by a tilting motion of said rod, so as to suspend said rod by its holder-engaged reel.

2. A holder for a fishing rod provided with an affixed reel having frame spacing rungs, comprising a supporting member having spread arms at its upper end adapted to spacedly extend around said rod and project upwardly above the latter, and notches in the edges of said arms adapted to detachably hook into engagement with the rungs of said reel, so as to suspend said rod by its holder-engaged reel.

3. A holder for a fishing rod provided with an affixed reel having frame spacing rungs, comprising a supporting member having spread arms at its upper end adapted to spacedly extend around said rod and project upwardly above the latter, notches in the upper end portions of said arms adapted to form a pivotal support for a spacing rung, and other edge notches in said arms adapted to be engaged with a second spacing rung by pivotal swing of said reel on its top notch supported rung.

4. In the construction set forth in claim 3, a pivoted detent carried by one arm and adapted to lock a reel rung in its seated position in an arm notch.

5. A holder for a fishing rod provided with an affixed reel and rearwardly extended handle, comprising a supporting member having spaced uprights each formed with a plurality of open reel-engaging seats adapted to be progressively engaged by a tilting lowering movement of said rod, so as to rigidly support said rod solely by its holder engaged reel with its handle freely extending beyond said holder.

FRANK NANASKO.